(12) United States Patent
Antony et al.

(10) Patent No.: US 10,747,564 B2
(45) Date of Patent: Aug. 18, 2020

(54) SPANNED DISTRIBUTED VIRTUAL SWITCH

(71) Applicant: VMWARE, INC., Palo Alto, CA (US)

(72) Inventors: Jinto Antony, Bangalore (IN); Sudhish P. T., Bangalore (IN); Madhusudhanan Gangadharan, Bangalore (IN); Sudhier Batara, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 39 days.

(21) Appl. No.: 14/790,009

(22) Filed: Jul. 2, 2015

(65) Prior Publication Data

US 2016/0291999 A1 Oct. 6, 2016

(30) Foreign Application Priority Data

Apr. 2, 2015 (IN) .......................... 1779/CHE/2015

(51) Int. Cl.
*G06F 9/455* (2018.01)
*G06F 16/178* (2019.01)
*H04L 12/24* (2006.01)

(52) U.S. Cl.
CPC ........ *G06F 9/45558* (2013.01); *G06F 16/178* (2019.01); *G06F 9/45533* (2013.01);
(Continued)

(58) Field of Classification Search
CPC . H04L 29/12839; H04L 41/082; H04L 45/22; H04L 49/70; H04L 41/0843;
(Continued)

(56) References Cited

U.S. PATENT DOCUMENTS 8,028,062 B1 * 9/2011 Wigmore ................ G06F 3/061
709/224
8,213,336 B2 * 7/2012 Smith ................... H04L 45/586
370/254
(Continued)

OTHER PUBLICATIONS

Yan, Dong. "Automated administration of virtual machines and networks on the vmware esx platform". May 23, 2011. MS thesis. pp. 5-12.*
(Continued)

*Primary Examiner* — Lewis A Bullock, Jr.
*Assistant Examiner* — Gilles R Kepnang
(74) *Attorney, Agent, or Firm* — Loza & Loza, LLP (57) ABSTRACT

Techniques for centralized management of network switch operations across multiple virtualization platforms via a "spanned distributed virtual switch." These techniques generally include creating a distributed virtual switch for each virtual platform that participates in the spanned distributed virtual switch, configuring each such distributed virtual switch with a mutually exclusive set of ports, configuring each distributed virtual switch with network configuration information for associated sets of ports, and synchronizing the network configuration information across distributed virtual switches. When configuration information changes in one distributed virtual switch, those changes are synchronized across other distributed virtual switches that participate in the spanned distributed virtual switch. A computer system, method, and computer-readable medium are provided herein.

13 Claims, 3 Drawing Sheets

(52) U.S. Cl.
CPC ............... *G06F 2009/4557* (2013.01); *G06F 2009/45595* (2013.01); *H04L 41/08* (2013.01)

(58) Field of Classification Search
CPC . H04L 12/4641; H04L 41/04; H04L 41/0226; H04L 41/142
USPC .......................................................... 718/1
See application file for complete search history.

(56) References Cited

U.S. PATENT DOCUMENTS

| | | | | |
|---|---|---|---|---|
| 8,750,164 | B2* | 6/2014 | Casado | H04L 12/4633 370/254 |
| 9,860,116 | B1* | 1/2018 | Jain | H04L 41/0806 |
| 2004/0022256 | A1* | 2/2004 | Green | H04L 12/4625 370/401 |
| 2004/0024911 | A1* | 2/2004 | Chung | H04L 41/0226 709/249 |
| 2005/0071452 | A1* | 3/2005 | Rosenstock | H04L 67/10 709/223 |
| 2009/0240790 | A1* | 9/2009 | Utsunomiya | H04L 63/0272 709/221 |
| 2010/0106823 | A1* | 4/2010 | Davis | G07F 17/32 709/224 |
| 2010/0165877 | A1* | 7/2010 | Shukla | H04L 41/0843 370/254 |
| 2011/0022694 | A1* | 1/2011 | Dalal | H04L 41/0843 709/222 |
| 2011/0238817 | A1* | 9/2011 | Okita | H04L 41/142 709/224 |
| 2011/0283278 | A1* | 11/2011 | Murrell | G06F 9/5077 718/1 |
| 2012/0016973 | A1* | 1/2012 | Haris | H04L 49/00 709/220 |
| 2012/0131662 | A1* | 5/2012 | Kuik | G06F 9/45558 726/11 |
| 2012/0227041 | A1* | 9/2012 | Lambeth | H04L 29/12839 718/1 |
| 2012/0287936 | A1* | 11/2012 | Biswas | H04L 12/4641 370/395.3 |
| 2012/0291026 | A1* | 11/2012 | Biswas | H04L 49/208 718/1 |
| 2012/0317567 | A1* | 12/2012 | Bailey | H04L 41/04 718/1 |
| 2013/0125112 | A1* | 5/2013 | Mittal | G06F 9/45558 718/1 |
| 2013/0148511 | A1* | 6/2013 | Banga | H04L 41/082 370/250 |
| 2013/0336134 | A1* | 12/2013 | Bao | H04L 41/046 370/252 |
| 2014/0012966 | A1* | 1/2014 | Baphna | H04L 49/70 709/221 |
| 2014/0036675 | A1* | 2/2014 | Wang | G06F 9/52 370/235 |
| 2014/0115584 | A1* | 4/2014 | Mudigonda | H04L 12/4641 718/1 |
| 2014/0129685 | A1* | 5/2014 | Bhatt | H04L 12/4641 709/220 |
| 2014/0297889 | A1* | 10/2014 | Dong | H04L 61/103 709/245 |
| 2014/0351396 | A1* | 11/2014 | Stabile | H04L 41/044 709/223 |
| 2014/0359620 | A1* | 12/2014 | Van Kerkwyk | G06F 9/45533 718/1 |
| 2015/0117256 | A1* | 4/2015 | Sabaa | H04L 49/15 370/254 |
| 2015/0200808 | A1* | 7/2015 | Gourlay | H04L 49/70 709/225 |
| 2015/0263970 | A1* | 9/2015 | Macchiano | H04L 45/22 709/223 |
| 2015/0263991 | A1* | 9/2015 | Macchiano | H04L 47/41 370/400 |
| 2016/0087841 | A1* | 3/2016 | Bharadwaj | H04L 41/0816 709/221 |
| 2016/0127272 | A1* | 5/2016 | Wang | H04L 45/66 370/392 |
| 2016/0226704 | A1* | 8/2016 | Astigarraga | H04L 43/12 |
| 2016/0254956 | A1* | 9/2016 | Xu | H04L 41/0809 370/255 |

OTHER PUBLICATIONS

Zhou, Shudong. "Virtual networking." Dec. 13, 2010. ACM SIGOPS Operating Systems Review 44.4 (2010): pp. 80-85.*
"VMware Virtual Switch," available at http://www.vmware.com/files/pdf/virtual_networking_concepts.pdf.
"Software Defined Networking," available at http://en.wikipedia.org/wiki/Software_Defined_Networking.

* cited by examiner

SPANNED DISTRIBUTED VIRTUAL SWITCH

RELATED APPLICATIONS

Benefit is claimed under 35 U.S.C. 119(a)-(d) to Foreign application Serial No. 1779/CHE/2015 filed in India entitled "SPANNED DISTRIBUTED VIRTUAL SWITCH", on Apr. 2, 2015, by VMware, Inc., which is herein incorporated in its entirety by reference for all purposes.

BACKGROUND

Computer virtualization is a technique that involves encapsulating a computing machine platform into a virtual machine (VM) that is executed under the control of virtualization software running on a hardware computing platform (also referred to herein as "host server" or "host"). A group of hardware computing platforms may be organized as a cluster to provide resources for VMs. In a data center, it is common to see hundreds, even thousands, of VMs running on multiple clusters of host servers.

A virtual infrastructure (VI) administrator may use virtualization management software to manage virtual machine configurations and computing resource allocations. One feature of the virtualized computing environment controlled by the virtualization management software is virtual networking. VMs can be created with software-based virtual network adapters that are logically connected to a virtual switch that is further connected to physical network adapters installed in the host computer. One approach for managing virtual network connections in data centers with a large number of VMs running on multiple host servers is the distributed virtual switch described in U.S. Pat. No. 8,195,774, incorporated by reference in its entirety herein. A distributed virtual switch is an abstraction of a switch across multiple host servers that permits virtual switches on the multiple host servers to be managed as if ports of those virtual switches belonged to a single switch, the distributed virtual switch. The distributed virtual switch may have uplinks which connect to physical network adapters, as well as VM ports which provide connections for VMs running in the host servers.

Traditionally, a distributed virtual switch is managed by virtualization management software that provides a cloud management system (CMS), such as VMware® vCenter Server™ (also referred to with the short name "vCenter Server" herein) which is commercially available from VMware, Inc. of Palo Alto, Calif. Virtualization management software generally controls a single virtualization platform, where a virtualization platform represents a collection of host computers that operate together. Examples of virtualization platforms include the VMware vSphere® virtualization platform (also referred to with the short name "vSphere" herein), which is commercially available from VMware, Inc. of Palo Alto, Calif., and the VMware vCloud® Air virtualization platform (also referred to with the short name "vCloud Air" herein), which is also commercially available from VMware, Inc. of Palo Alto, Calif. Multiple virtualization platforms may cooperate to provide "hybrid" virtualization services. For example, the vSphere virtualization platform may be installed at a particular data center that is controlled by a particular user, while the vCloud Air virtualization platform is installed at one or more various other sites not controlled by that user, and thus said to be "in the cloud." Virtual machines may be created at the vCloud Air virtualization platform on demand when computing requirements exceed the computing capacity of the hardware associated with the VMware vSphere virtualization platform.

Although distributed virtual switches act as a single switch across hosts of a virtualization platform, thus easing management burden on a management team, distributed virtual switches do not act as a single switch across virtualization platforms. Thus, an administrator must configure multiple individual distributed virtual switches when managing computer infrastructure that spans across multiple virtualization platforms. This requirement for independent management of distributed virtual switches imposes a burden on management teams, which may lead to increased cost, in both time and money, of managing virtualization resources across multiple virtualization platforms.

SUMMARY

A method for operating a networking switch across virtualization platforms is provided herein. The method includes detecting a first change to first network configuration information stored in a first configuration file for a first distributed virtual switch operating at a first virtualization environment. The method also includes synchronizing the first configuration file with a second configuration file that stores second network configuration information for a second distributed virtual switch operating at a second virtualization environment. Both the first configuration file and the second configuration file store network configuration information for ports managed by both the first distributed virtual switch and the second distributed virtual switch.

A computer system for operating a networking switch across virtualization platforms is provided. The computer system includes a distributed virtual switch management module. The distributed virtual switch management module is configured to detect a first change to first network configuration information stored in a first configuration file for a first distributed virtual switch operating at a first virtualization environment. The distributed virtual switch management module is also configured to synchronize the first configuration file with a second configuration file that stores second network configuration information for a second distributed virtual switch operating at a second virtualization environment. Both the first configuration file and the second configuration file store network configuration information for ports managed by both the first distributed virtual switch and the second distributed virtual switch.

A non-transitory computer readable medium storing instructions that, when executed by a processor, cause the processor to execute a method is provided. The method includes detecting a first change to first network configuration information stored in a first configuration file for a first distributed virtual switch operating at a first virtualization environment. The method also includes synchronizing the first configuration file with a second configuration file that stores second network configuration information for a second distributed virtual switch operating at a second virtualization environment. Both the first configuration file and the second configuration file store network configuration information for ports managed by both the first distributed virtual switch and the second distributed virtual switch.

Further embodiments of the present invention include a computer system configured to carry out the above method, and a non-transitory computer-readable storage medium comprising instructions that cause the computer system to carry out the above methods.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments disclosed herein provide techniques for centralized management of network switch operations across multiple virtualization platforms via a "spanned distributed virtual switch." These techniques generally include creating a distributed virtual switch for each virtual platform that participates in the spanned distributed virtual switch, configuring each such distributed virtual switch with a mutually exclusive set of ports, configuring each distributed virtual switch with network configuration information for associated sets of ports, and synchronizing the network configuration information across distributed virtual switches. When configuration information changes in one distributed virtual switch, those changes are synchronized across other distributed virtual switches that participate in the spanned distributed virtual switch.

Figure 1:
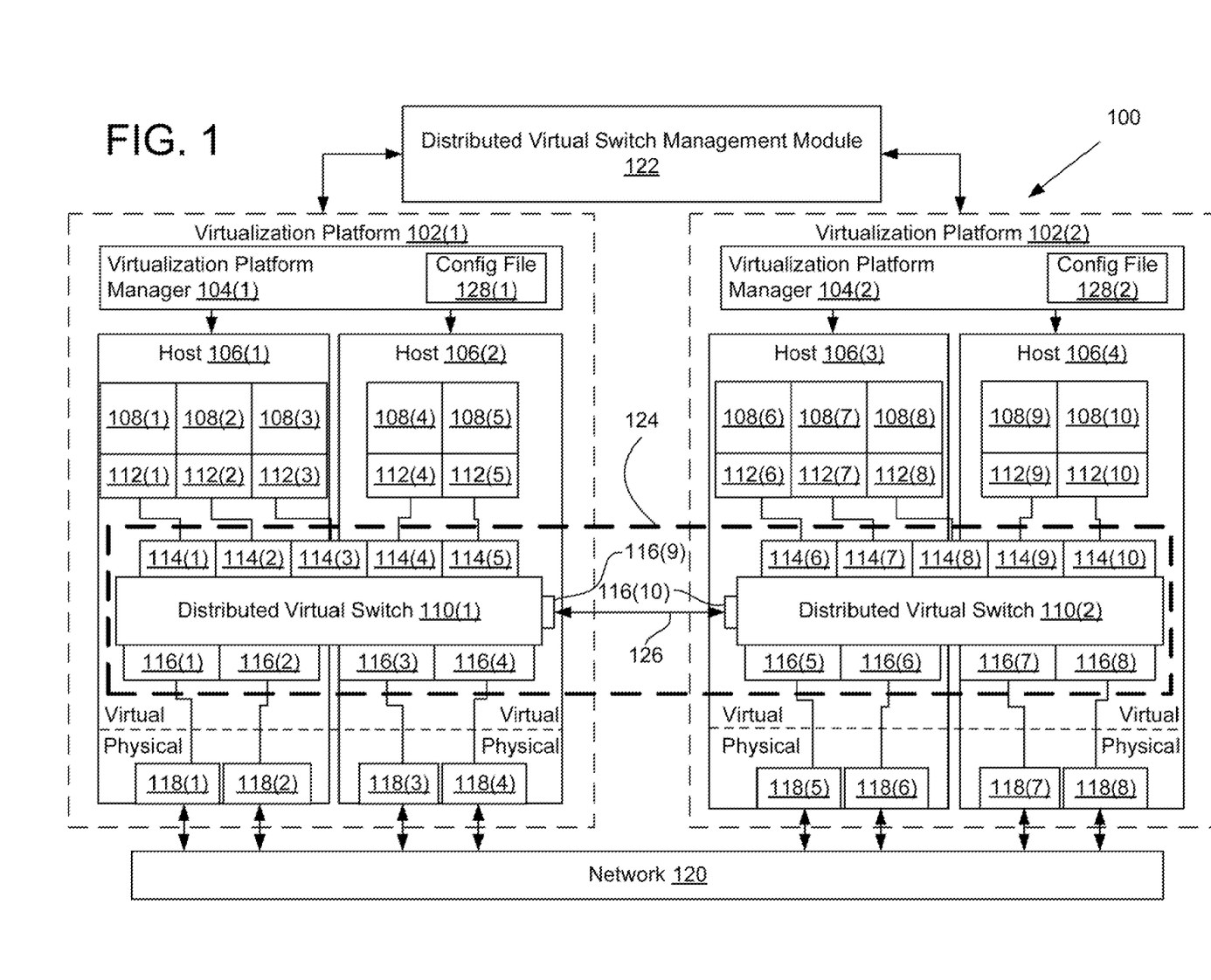
FIG. 1 depicts a virtualization system, according to an example.

FIG. 1 depicts a virtualization system 100, according to an example. As shown, virtualization system 100 includes a distributed virtual switch management module 122, a first virtualization platform 102(1), and a second virtualization platform 102(2).

Each virtualization platform 102 includes one or more hosts 106, and a virtualization platform manager 104. Each virtualization platform 102 represents a centrally controlled virtualization environment that may include a number of different hardware devices and software modules that work together to make available computing resources in the form of virtual machines 108 (VMs) and to perform other associated functionality. One example of a virtualization platform 102 is the vSphere virtualization platform mentioned above. Another example of a virtualization platform 102 is the vCloud Air virtualization platform mentioned above.

Multiple virtualization platforms 102 may cooperate to provide "hybrid" virtualization services. For example, a local virtualization platform (such as the vSphere virtualization platform) may be operating at a particular data center that is controlled by a particular user or organization, while a cloud-based virtualization platform (such as the vCloud Air virtualization platform) is operating at one or more various other sites not controlled by that user or organization, and thus said to be "in the cloud." Virtual machines may be created at the cloud-based virtualization platform on demand when computing requirements exceed the computing capacity of the hardware associated with the local virtualization platform. Virtual machines 108 executing in the local virtualization platform may be referred to as "on-premise" and virtual machines 108 executing in the cloud-based virtualization platform may be referred to as "off-premise."

A virtualization platform manager 104 controls and coordinates various tasks related to VMs 108 within a particular virtualization platform 102. Some example tasks that may be performed by virtualization platform manager 104 are VM configuration and administration, including VM provisioning (creation and deletion of VMs 108). VM 108 migrating, network provisioning, network configuration, and many other tasks. One example of a virtualization platform manager 104 is the vCenter Server discussed above.

Each host 106 is a physical computer system that includes hardware such as processors, memory, data storage, and the like. The hosts 106 execute a hypervisor that executes and manages one or more virtual machines 108 (VMs), each of which is an emulation of a computer system. One example of a hypervisor is VMware® ESXi™ Hypervisor (also referred to with the short name of "ESXi" herein), commercially available from VMware of Palo Alto, Calif. Virtual machines 108 may execute an operating system and applications running "on top" of the operating system. Virtual machines 108 provide many benefits, including isolation of work from different tenants, scalability, and portability, as well as many other benefits. For instance, VMs 108 may be migrated between hosts 106 and between virtualization platforms 102.

It should be noted that although hosts 106 are described as including and executing virtual machines, other "virtual contexts," may instead be included and executed. Such virtual contexts may include containers that do not include a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies.

Virtualization platform manager 104 also manages virtual networks, which comprise simulated computer networks that provide networking functionality to VMs 108. These simulated computer networks do not represent physical networks, but rather exist at the abstraction level of the VMs 108 and the simulated software being executed by the VMs 108.

To provide traffic routing among for virtual networks, hosts 106 cooperate to provide a distributed virtual switch 110. Distributed virtual switches 110 provide switching functionality for network traffic flowing through virtual networks managed within a virtualization platform 102. Distributed virtual switches 110 operate at the abstraction level of the VMs 108 but also include connectivity to a physical network via "uplinks," described in more detail below. Distributed virtual switches 110 include a set of ports, each of which is coupled to a VM 108, to another virtual device, or is designated as an uplink. Distributed virtual switches 110 receive network traffic and route that traffic to a specified destination by outputting that traffic via one or more ports.

Ports in a distributed virtual switch 110 may include dvports 114, which connect to VMs and dvUplinks 116, which provide a level of abstraction on top of physical network interface controllers ("pNICs") 118 that couple hosts 106 to network 120. pNICs 118 are physical devices included in hosts 106 that provide networking functionality for hosts 106. A virtual network interface controller ("vNIC") 112 of each VM 108 may be connected to a particular distributed virtual port ("dvport") 114 of a distributed virtual switch 110. vNICs 112 are virtual network devices that provide networking functionality to VMs 108 at the abstraction level at which the VMs 108 operate.

Distributed virtual switches 110 operate differently than another type of virtual switch known as a standard switch. More specifically, standard switches provide switching functionality for VMs 108 in a single host 106 but do not provide such functionality for VMs 108 across hosts in a virtualization platform 102 in a coordinated manner. Standard switches do not coordinate port numbers across hosts 106, for instance. In other words, each standard switch has its own set of port numbers. This means that an administrator configuring hosts 106 using standard switches must be aware of multiple independent sets of port numbers. Moreover, while standard switches are aware of port numbers and network settings for VMs 108 executing in the host 106 in which the standard switch is executing, standard switches are not natively aware of port numbers or network settings for VMs 108 in other hosts 106.

Distributed virtual switches 110 alleviate many of the issues associated with standard switches by providing a single virtualized switch that acts coherently across multiple hosts 106 in a virtualization platform 102. Distributed virtual switches 110 maintain a single set of ports, are aware of network settings for each of the ports, and generally provide functionality for coherent networking for multiple hosts 106 within a virtualization platform 102.

Distributed virtual switches 110 do not work across virtualization platforms 102, however. More specifically, a single distributed virtual switch 110 does not manage ports, port settings, and network settings for VMs 108 that are managed by two different virtualization platforms 102. To provide such functionality, additional techniques are disclosed herein. More specifically, distributed virtual switch management module 122 coordinates the actions of multiple different distributed virtual switches 110 that are executing in different virtualization platforms 102 in order to coherently manage network and port settings across virtualization platforms 102, thus creating and managing a construct referred to herein as a "spanned distributed virtual switch."

To coordinate the distributed virtual switches 110, distributed virtual switch management module 122 creates a logical construct referred to herein as a "spanned distributed virtual switch 124" which acts as a single switch across multiple virtualization platforms 102. To create the spanned distributed virtual switch 124, distributed virtual switch management module 122 creates individual distributed virtual switches 110 for each virtualization platform 102 participating in the spanned distributed virtual switch 124. Distributed virtual switch management module 122 also creates and maintains common, coordinated configuration files 128 in each virtualization platform 102 participating in the spanned distributed virtual switch 124. Distributed virtual switch management module 122 controls the individual distributed virtual switches 110 in a coordinated manner in conjunction with the common configuration files 128 in order to implement the spanned distributed virtual switch 124.

To begin operating a spanned distributed virtual switch 124, distributed virtual switch management module 122 initializes a spanned distributed virtual switch 124. To initialize a spanned distributed virtual switch 124, distributed virtual switch management module 122 creates a distributed virtual switch 110 in each virtualization platform 102 that is to participate in the spanned distributed virtual switch 124. Distributed virtual switch management module 122 makes switch port numbers consistent by assigning mutually exclusive sets of port numbers to the different distributed virtual switches 110. In one example, distributed virtual switch management module 122 configures a first distributed virtual switch 110(1) with a first set of ports having a first set of consecutive port numbers and configures a second distributed virtual switch 110(2) with a second set of ports having a second set of consecutive port numbers. The first set of port numbers may be represented as ports 1 through n and the second set of port numbers may be represented as ports n+1 through m. In one example, n is 1024 and m is 2048, but it should be understood that any number may be chosen for n or m. It should also be understood that any mutually exclusive sets of ports may be created. With mutually exclusive port numbers assigned to the different distributed virtual switches 110, ports may be assigned to VMs 108 existing in different virtualization platforms 102. In other words, a single port number is not assigned to two different VMs 108, thus making each port number act as a unique identifier across the spanned distributed virtual switch 124.

In addition to the consistent port number assignments, distributed virtual switch management module 122 also maintains common configuration information in common configuration files 128. Although illustrated as stored within each virtualization platform 102, the common configuration files 128 may be stored outside of the virtualization platforms 102, at any location that is accessible by each virtualization platform 102.

Distributed virtual switch management module 122 may configure spanned distributed virtual switch 124 with initial configuration information. This initial configuration information would be stored in each configuration file 128 so that distributed virtual switches 110 at each virtualization platform 102 are aware of the configuration information for each port of spanned distributed virtual switch 124. When network configuration changes occur for any particular port (dvport 114 or dvUplink 116, for example), distributed virtual switch management module 122 updates the configuration files 128 in both virtualization platforms 102 with the changed configuration information. This allows both virtualization platforms 102 to be aware of network settings for VMs 108 executing in a different virtualization platform 102.

The configuration information that is maintained in the common configuration files 128 may include any type of network configuration information that is typically associated with distributed virtual switches 110. In various examples, this configuration information may include per-port information. In other words, the configuration information would include configuration information for each port of spanned distributed virtual switch 124. This configuration information can include: network input/output control ("NIOC") configuration information, port mirroring configuration information, health monitoring configuration information, which distributed virtual switch 110 is associated with the port, traffic shaping configuration information, netflow configuration information, and other data related to the ports. In addition to managing configuration information on a port-by-port basis, distributed virtual switch management module 122 may assign various ports to port groups, where a port group includes one or more ports that share a network configuration. The configuration information thus may also specify which ports belong to which port groups. Virtualization platforms 102 perform network functionality in accord with this configuration information.

NIOC is a set of techniques that allows control over network traffic flows. Specifically, traffic is divided into a set of pools such as fault tolerance traffic, data storage traffic (e.g., Internet Small Computer System Interface or "iSCSI" traffic), VM 108 migration traffic, management traffic, VM 108 replication traffic, network file system ("NFS") traffic, and virtual machine traffic. Other network pools may be created and managed as well. NIOC allows management of bandwidth assigned to each pool. Specifically, NIOC partitions bandwidth to different pools based on pre-designated bandwidth allocations. Ports or port groups may be added to the various pools so that the bandwidth management is applied to those ports or port groups.

Port mirroring is a technique in which network packets sent to or from a particular switch port are also copied and sent to a network-monitoring device on another switch port. Configuration information for port mirroring may include information that indicates whether port mirroring is enabled and, if so, what ports to forward network packets to.

Health monitoring includes monitoring for the following conditions: whether the network connection is up or down, how much bandwidth is being utilized, and network device status and utilization. Health monitoring may include monitoring for other conditions related to the network connection as well.

Netflow is a set of techniques for collecting and analyzing network "flows" (or recorded network traffic) in order to analyze network status. Configuration information for netflow includes whether netflow is enabled, which distributed virtual switch 110 to collect flows for, the address of a flow collector, and other information.

Port group details include information regarding which port groups are defined, what ports are included in those port groups, and what configuration is applied to the port groups.

Changes to configuration information may occur in a variety of situations. For example, manually or programmatically changing any of the configuration information described above would first cause those changes to be reflected in the associated configuration file 128 and would then cause those changes to be synchronized from the configuration file 128 associated with the virtualization platform 102 for which the configuration information was changed to the configuration file 128 associated with the other virtualization platform 102 participating in spanned distributed virtual switch 124. Certain operations inherently change configuration information. Thus, when these operations occur, configuration information is synchronized. These operations include, for example, cross-virtualization-platform VM migration and cross-virtualization platform VM cloning.

Cross virtualization platform VM migration includes migrating a VM 108 from a host within one virtualization platform 102 to another virtualization platform 102. Prior to migrating a VM 108, the distributed virtual switch management module 122 synchronizes the configuration files 128 in the different virtualization platforms 102. Next, virtualization platforms 102 cooperate to move a particular VM 108 from one virtualization platform 102 to another virtualization platform 102. Because each distributed virtual switch 110 services only VMs 108 in a single virtualization platform 102, the migrated VM 108 is "detached" from the dvport 114 to which the migrated VM 108 is originally connected and is "connected" to a port on the distributed virtual switch 110 in the virtualization platform 102 to which the migrated VM 108 is migrated. This new port has a different port number than the original port to which the VM 108 was connected, because the spanned distributed virtual switch 124 maintains mutually exclusive port numbers for different distributed virtual switches 110. After the VM 108 is migrated, distributed virtual switch management module 122 updates configuration files 128 at each location to reflect the changes to migrated VM 108. This change includes the change to the port number, the distributed virtual switch 110 to which the VM 108 is attached, and any other changes to configuration information that would occur. To update the configuration files 128, the distributed virtual switch management module 122 may update the configuration file 128 at the virtualization platform 102 to which the VM 108 was migrated and then synchronize the configuration files 128 so that the configuration file 128 at the other virtualization platform 102 is in agreement with the configuration information at the first virtualization platform 102.

To improve the speed of operations related to spanned distributed virtual switch 124, a leased line 126 may couple distributed virtual switches 110 together. A leased line is a dedicated network connection between computer systems at two distinct locations and thus provides a level of stability and performance over standard networking connections. Each distributed virtual switch 110 may include an uplink 116 (e.g., a distributed virtual uplink) that is connected to another distributed virtual switch 110 via the leased line 126 in order to provide the described connectivity.

Figure 2:
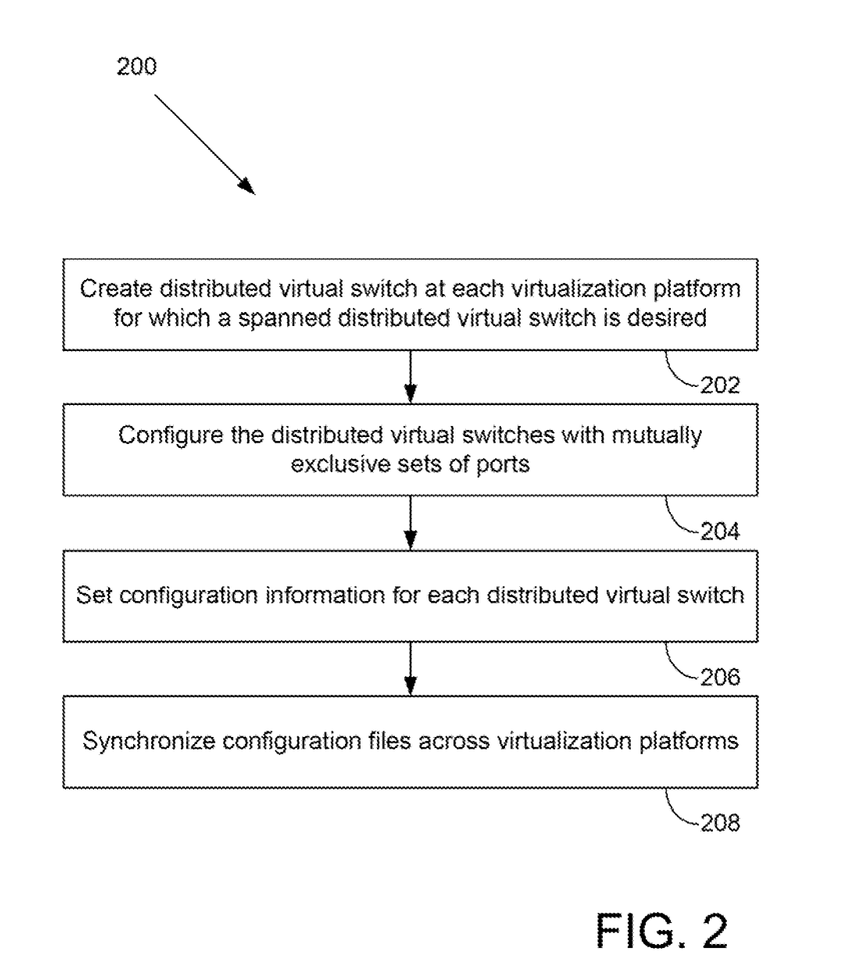
FIG. 2 is a flow diagram of a method for initializing a spanned distributed virtual switch, according to an example.

FIG. 2 is a flow diagram of a method 200 for initializing a spanned distributed virtual switch 124, according to an example. The method 200 begins at step 202, where distributed virtual switch management module 122 creates a distributed virtual switch 110 at each of the virtualization platforms 102 for which a spanned distributed virtual switch 124 is desired. As described above, each distributed virtual switch 110 has the capability to act as a single, unified switch for each host 106 in a single virtualization platform 102, simulating switch ports in a coherent manner. Each distributed virtual switch 110 thus routes traffic for VMs 108 of a particular virtualization platform 102.

At step 204, the distributed virtual switch management module 122 configures each of the created distributed virtual switches 110 with mutually exclusive sets of ports. More specifically, each distributed virtual switch 110 is assigned with a different set of ports, where none of the ports assigned to one distributed virtual switch 110 are assigned to any other distributed virtual switch 110. In one example, distributed virtual switch management module 122 configures a first distributed virtual switch 110(1) with a first set of ports having a first set of consecutive port numbers and configures a second distributed virtual switch 110(2) with a second set of ports having a second set of consecutive port numbers. The first set of port numbers may be represented as ports 1 through n and the second set of port numbers may be represented as ports n+1 through m. In one example, n is 1024 and m is 2048, but it should be understood that any number may be chosen for n or m. It should also be understood that any mutually exclusive sets of ports may be created. With mutually exclusive port numbers assigned to the different distributed virtual switches 110, ports may be assigned to VMs 108 existing in different virtualization platforms 102. In other words, a single port number is not assigned to two different VMs 108, thus making each port number act as a unique identifier across the spanned distributed virtual switch 124.

At step 206, distributed virtual switch management module 122 sets configuration information for each distributed virtual switch 110. This configuration information may include any of the information described above, including NIOC configuration information, port mirroring configuration information, health monitoring configuration information, which distributed virtual switch 110 is associated with the port, port group details, traffic shaping configuration information, netflow configuration information, and other data related to the ports. This initial configuration information would be stored in each configuration file 128 so that distributed virtual switches 110 at each virtualization platform 102 are aware of the configuration information for each port of spanned distributed virtual switch 124. When network configuration changes occur for any particular port (dvport 114 or dvUplink 116, for example), distributed virtual switch management module 122 updates the configuration files 128 in both virtualization platforms 102 with the changed configuration information. This allows both virtualization platforms 102 to be aware of network settings for VMs 108 executing in a different virtualization platform 102. In addition to managing configuration information on a port-by-port basis, distributed virtual switch management module 122 may assign various ports to port groups, where a port group includes one or more ports that share a network configuration.

At step 208, distributed virtual switch management module 122 synchronizes the configuration files 128 across the virtualization platforms 102. By synchronizing these configuration files and having mutually exclusively assigned ports, a spanned distributed virtual switch 124 is created with coherently assigned ports and with configuration information that is consistent across virtualization platforms 102.

Figure 3:
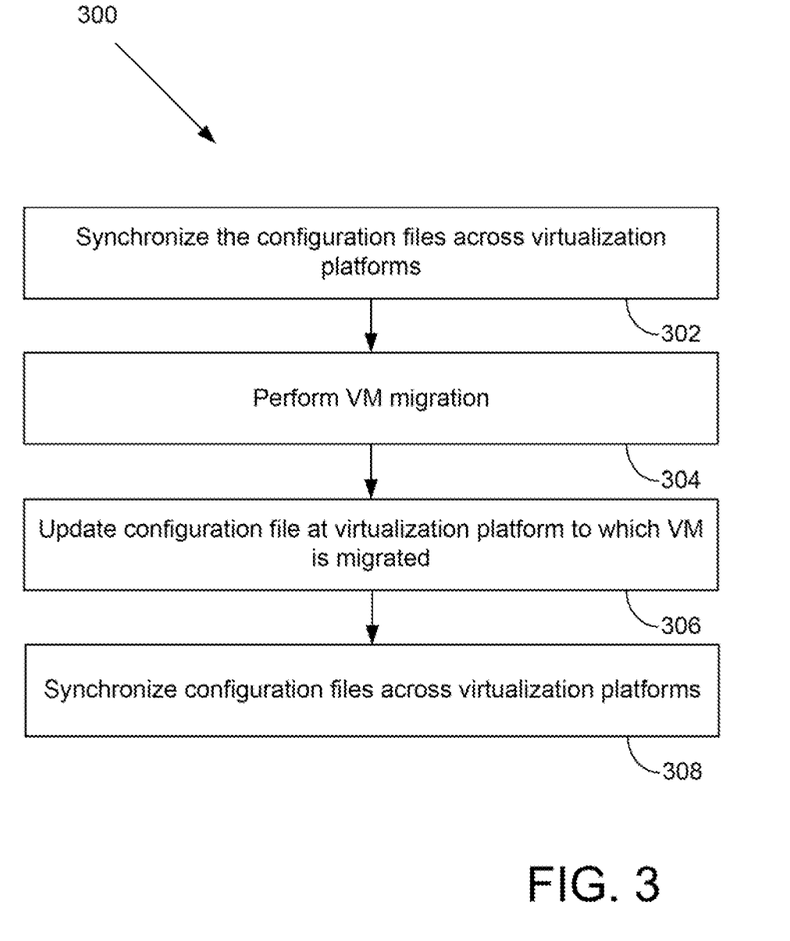
FIG. 3 is a flow diagram of a method for migrating VMs from one virtualization platform to another virtualization platform using a spanned distributed virtual switch, according to an example.

FIG. 3 is a flow diagram of a method 200 for migrating VMs 108 from one "source" virtualization platform 102 to another "destination" virtualization platform 102 using a spanned distributed virtual switch 124, according to an example. At step 302, the spanned distributed virtual switch 124 synchronizes the configuration files 128 across the different virtualization platforms 102. This involves copying configuration data from each configuration file 128 to the other configuration file 128 so that each configuration file 128 has the same configuration information.

At step 304, distributed virtual switch management module 122 performs a VM migration. A VM migration involves detaching a VM 108 from a distributed virtual switch 124, copying the working data for the VM 108 including execution state and the like from a host 106 in a source virtualization platform 102 to a destination virtualization platform 102 to create a migrated VM 108 and connecting the migrated VM 108 to a distributed virtual switch 124 in the destination virtualization platform 102.

At step 306, distributed virtual switch management module 122 causes the configuration file at the destination virtualization platform 102 to be updated to include configuration information for the migrated VM 108, including the port number, as well as the configuration information associated with the VM 108 at its original virtualization platform 102. The configuration file 128 at the destination virtualization platform 102 includes configuration information for the migrated VM 108 at the new port. At step 308, distributed virtual switch management module 122 synchronizes configuration files 128 across virtualization platforms 102. Synchronizing the configuration files 128 causes the new configuration data present in the configuration file 128 associated with the destination virtualization platform 102 and with the migrated VM 108 to be copied the source virtualization platform 102. This allows the new port information for the migrated VM 108, which is different than the port information of that VM 108 as stored in the source virtualization platform 102, to be copied to that source virtualization platform. Thus, the configuration information for the migrated VM 108 is stored at each virtualization platform 102.

Advantageously, embodiments disclosed herein create a spanned distributed virtual switch across virtualization platforms, allowing a distributed virtual switch to be managed for multiple virtualization platforms in a centralized manner. This reduces the amount of configuration and management tasks that must be performed by an administration team, since individual distributed virtual switches do not need to be configured.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operation system in which at least one application runs. It should be noted that these embodiments may also apply to other examples of contexts, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for virtual machine migration, the method comprising:
   implementing a spanned distributed virtual switch by creating a first distributed virtual switch with a first set of ports having a first set of port numbers and creating a second distributed virtual switch with a second set of ports having a second set of port numbers that do not include port numbers of the first set of port numbers, wherein the first distributed virtual switch operates at a first virtualization environment, wherein the second distributed virtual switch operates at a second virtualization environment, and wherein each distributed virtual switch is a virtual switch across a plurality of hosts;
   storing first initial configuration information for the first distributed virtual switch in a first configuration file;
   storing second initial configuration information for the second distributed virtual switch in a second configuration file;
   performing migration of a virtual machine, using the spanned distributed virtual switch, the virtual machine being migrated from the second virtualization environment that includes a second plurality of hosts to the first virtualization environment that includes a first plurality of hosts;
   during the migration:
      detaching the virtual machine from a second port of the second set of ports associated with the second distributed virtual switch; and
      attaching the virtual machine to a first port of the first set of port numbers associated with the first distributed virtual switch;
   subsequent to the migration, assigning a port number of the first port as a unique identifier for the attached virtual machine the unique identifier being assigned, from the first distributed virtual switch, across the spanned distributed virtual switch;
   automatically updating the first configuration file to include 1) the unique identifier assigned across the spanned distributed virtual switch and 2) network configuration information about the first port at the first virtualization environment;
   based on the unique identifier assigned across the spanned distributed virtual switch, synchronizing the first configuration file with the second configuration file by copying the network configuration information from the first configuration file to the second configuration file and notifying the second virtualization environment about the port number assigned at the first virtualization environment, wherein both the first configuration file and the second configuration file store network configuration information for ports managed respectively by both the first distributed virtual switch and the second distributed virtual switch, wherein synchronizing the first configuration file with the second configuration file is performed by a processor, and wherein each of the first and second distributed virtual switches is assigned a mutually exclusive set of port numbers and the second distributed virtual switch is assigned the second set of ports having a second set of port numbers that are in an ascending order or a descending order to the first set of port numbers; and
   executing the migrated virtual machine coupled to the first port having the different port number at the first virtualization environment, based on the synchronized configuration files.

2. The method of claim 1, wherein first network configuration information of the first configuration file and second network configuration information of the second configuration file comprise port group details.

3. The method of claim 1, wherein first network configuration information of the first configuration file and second network configuration information of the second configuration file comprise one or more of network input/output control configuration information, port mirroring configuration information, health monitoring configuration information, traffic shaping configuration information, and network traffic analysis configuration information.

4. The method of claim 1, further comprising:
detecting a migration of a first virtual machine (VM) from the second virtualization environment to the first virtualization environment; and
moving the first VM from the second virtualization environment to the first virtualization environment.

5. The method of claim 4, wherein a first change to first network configuration of the first configuration file comprises:
a modification to network data associated with the first port to indicate that the VM is connected to the first port, and
a modification to network data associated with the first port to include network configuration information associated with the VM at the second virtualization environment.

6. The method of claim 5, further comprising:
detecting a second change to second network configuration information stored in the second configuration file; and
synchronizing the second configuration file with the first configuration file, wherein the second change comprises a modification to network data associated with the second port to indicate that the VM is not connected to the second port.

7. A computer system for virtual machine migration, the computer system comprising:
memory; and
a processor configured to:
implement a spanned distributed virtual switch by creating a first distributed virtual switch with a first set of ports having a first set of port numbers and creating a second distributed virtual switch with a second set of ports having a second set of port numbers that do not include port numbers of the first set of port numbers, wherein the first distributed virtual switch operates at a first virtualization environment, wherein the second distributed virtual switch operates at a second virtualization environment, and wherein each distributed virtual switch is a virtual switch across a plurality of hosts;
storing first initial configuration information for the first distributed virtual switch in a first configuration file;
storing second initial configuration information for the second distributed virtual switch in a second configuration file;
perform migration of a virtual machine, using the spanned distributed virtual switch, the virtual machine being migrated from the second virtualization environment that includes a second plurality of hosts to the first virtualization environment that includes a first plurality of hosts;
during the migration:
detach the virtual machine from a second port of the second set of ports associated with the second distributed virtual switch; and
attach the virtual machine to a first port of the first set of port numbers associated with the first distributed virtual switch;
subsequent to the migration, assigning, a port number of the first port as a unique identifier for the attached virtual machine, the unique identifier being assigned, from the first distributed virtual switch, across the spanned distributed virtual switch;
automatically updating the first configuration file to include 1) the unique identifier assigned across the spanned distributed virtual switch and 2) network configuration information about the first port at the first virtualization environment;
based on the unique identifier assigned across the spanned distributed virtual switch, synchronize the first configuration file with Rail the second configuration file by copying the network configuration information from the first configuration file to the second configuration file and notifying the second virtualization environment about the port number assigned at the first virtualization environment, wherein both the first configuration file and the second configuration file store network configuration information for ports managed respectively by both the first distributed virtual switch and the second distributed virtual switch, and wherein each of the first and second distributed virtual switches is assigned a mutually exclusive set of port numbers and the second distributed virtual switch is assigned a second set of ports having a second set of port numbers that are in an ascending order or a descending order to the first set of port numbers; and
execute the migrated virtual machine coupled to the first port having the different port number at the first virtualization environment, based on the synchronized configuration files.

8. The computer system of claim 7, wherein first network configuration information of the first configuration file and second network configuration information of the second configuration file comprise port group details.

9. The computer system of claim 7, wherein first network configuration information of the first configuration file and second network configuration information of the second configuration file comprise one or more of network input/output control configuration information, port mirroring configuration information, health monitoring configuration information, traffic shaping configuration information, and network traffic analysis configuration information.

10. The computer system of claim 7, wherein the processor is further configured to:
detect a migration of a first virtual machine (VM) from the second virtualization environment to the first virtualization environment; and
move the first VM from the second virtualization environment to the first virtualization environment.

11. The computer system of claim 10, wherein a first change to first network configuration of the first configuration file comprises:
a modification to network data associated with the first port to indicate that the VM is connected to the first port, and
a modification to network data associated with the first port to include network configuration information associated with the VM at the second virtualization environment.

12. The computer system of claim 11, wherein the processor is further configured to:
detect a second change to second network configuration information stored in the second configuration file; and
synchronize the second configuration file with the first configuration file, wherein the second change comprises a modification to network data associated with the second port to indicate that the VM is not connected to the second port.

13. A non-transitory computer-readable medium storing instructions that, when executed by a processor, cause the processor to perform a method, the method comprising:
    implementing a spanned distributed virtual switch by creating a first distributed virtual switch with a first set of ports having a first set of port numbers and creating a second distributed virtual switch with a second set of Ports having a second set of port numbers that do not include port numbers of the first set of port numbers, wherein the first distributed virtual switch cerates at a first virtualization environment, wherein the second distributed virtual switch operates at a second virtualization environment, and wherein each distributed virtual switch is a virtual switch across a plurality of hosts;
    storing first initial configuration information for the first distributed virtual switch in a first configuration file;
    storing second initial configuration information for the second distributed virtual switch in a second configuration file;
    performing migration of a virtual machine, using the spanned distributed virtual switch, the virtual machine being migrated from the second virtualization environment that includes a second plurality of hosts to the first virtualization environment that includes a first plurality of hosts;
    during the migration:
        detaching the virtual machine from a second port of the second set of ports associated with the second distributed virtual switch; and
        attaching the virtual machine to a first port of the first set of port numbers associated with the first distributed virtual switch;
    subsequent to the migration, assigning a port number of the first port as a unique identifier for the attached virtual machine, the unique identifier being assigned, from the first distributed virtual switch, across the spanned distributed virtual switch;
    automatically updating the first configuration file to include 1) the unique identifier assigned across the spanned distributed virtual switch and 2) network configuration information about the first port at the first virtualization environment;
    based on the unique identifier assigned across the spanned distributed virtual switch, synchronizing the first configuration file with the second configuration file by copying the network configuration information from the first configuration file to the second configuration file and notifying the second virtualization environment about the port number assigned at the first virtualization environment, wherein both the first configuration file and the second configuration file store network configuration information for ports managed respectively by both the first distributed virtual switch and the second distributed virtual switch, wherein synchronizing the first configuration file with the second configuration file is performed by a processor, and wherein each of the first and second distributed virtual switches is assigned a mutually exclusive set of port numbers and the second distributed virtual switch is assigned a second set of ports having a second set of port numbers that are in an ascending order or a descending order to the first set of port numbers; and
    executing the migrated virtual machine coupled to the first port having the different port number at the first virtualization environment, based on the synchronized configuration files.

* * * * *